May 23, 1961
E. G. R. RANHAGEN
2,985,236
IMPREGNATION OF WOOD CHIPS
Filed March 20, 1958
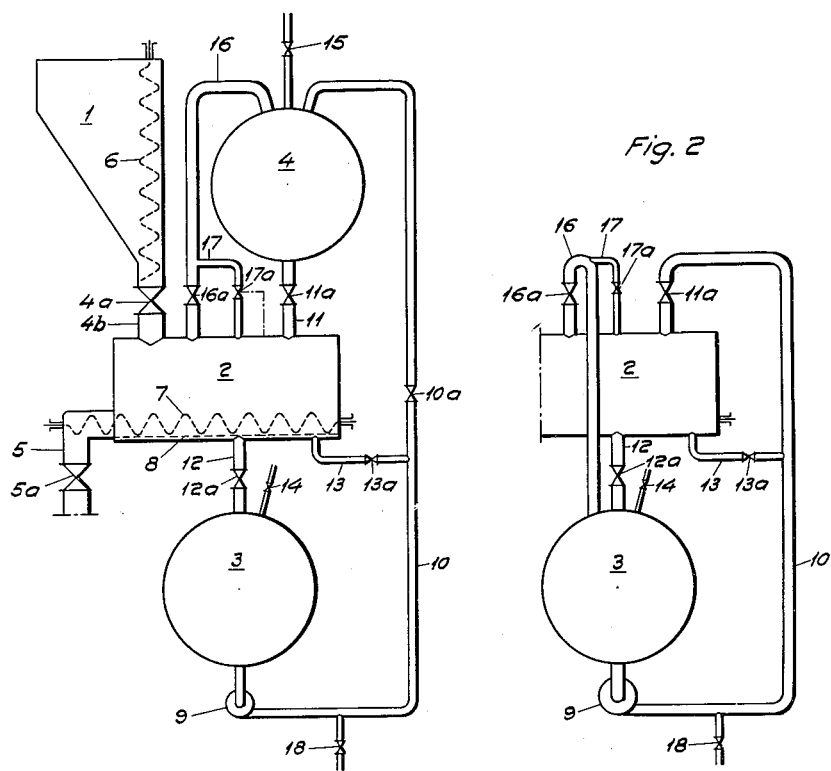
INVENTOR.
ERNST GUSTAF RANE RANHAGEN
BY
ATTORNEY.

United States Patent Office 2,985,236
Patented May 23, 1961

2,985,236
IMPREGNATION OF WOOD CHIPS
Ernst Gustaf Rane Ranhagen, Danderyd, Sweden, assignor to Aktiebolaget Celleco, Stockholm, Sweden, a corporation of Sweden
Filed Mar. 20, 1958, Ser. No. 722,689
Claims priority, application Sweden Mar. 27, 1957
1 Claim. (Cl. 162—237)

This invention relates to plants for impregnation of wood chips to be subjected to a subsequent continuous cellulose cooking process and more especially to such plants comprising a closed impregnation tank and means for feeding such chips through said tank to digesters in which said continuous cooking process takes place while impregnating the chips in the impregnation tank with impregnating liquid supplied from a closed accumulator system for such liquid.

It is the main object of the invention to provide an arrangement of components to enable said impregnation step to be operated or controlled according to the so-called shock method.

This shock method and the advantages thereof are previously known per se, for instance from U.S. Patent No. 480,334 dated August 9, 1892. The use of that method has heretofore been restricted to the application thereof to batch cooking processes.

The main advantage of the invention is to provide previously unknown means in order to combine the advantages of the shock method with the advantages of the continuous cooking process.

It is another object of the invention to provide an arrangement that will combine simplicity of structure with simplicity of operation of the shock impregnation method in connection with the continuous cooking process.

The invention will be described in detail with reference to the accompanying drawing, in which Fig. 1 illustrates a complete arrangement in conformity with the invention, and Fig. 2 illustrates a part of this arrangement in a modified embodiment.

The illustrations are diagrammatical and serve as examples only. Identical details in the different figures are indicated with the same reference characters.

Fig. 1 shows a chip bin 1, an impregnation tank 2 and containers 3 and 4 in an accumulator system for impregnating liquid, for example consisting of neutral sulphite lye. Through an inlet 4b, with a shut-off valve 4a the impregnation tank 2 is in closed communication with the chip bin 1, and through an outlet 5 with a shutoff valve 5a, said tank 2 is in closed communication with the actual pulp-making plant, which is not shown in the drawbut, for example, may comprise a refiner of the disc type or a continuously operating digester of some known kind. There is arranged a screw feeder 6 in the chip bin and a screw feeder 7 in the impregnation tank arranged to feed chips through the valve 4a and the valve 5a so that the pulp-making plant can be charged with chips via the impregnation tank. The charging is controlled by opening the valve 4a, after valve 5a has been closed, so that the requisite quantity of chips for impregnation will be supplied into the impregnation tank, in which the chips, after the valve 4a has been closed again, are allowed to remain during the impregnation period. The chips are subsequently passed on out through valve 5a, after which the feeding procedure is repeated with a fresh quantity of chips, and so on. The screw feeders are only kept in motion while the feeding takes place through the respective valves. Underneath the screw feeder 7 a bottom strainer 8 is arranged through which chips cannot pass.

By means of a feed pump 9 and a pipe-line 10 with valve 10a impregnating liquid accumulated in container 3 can be filled into container 4 with the quantity as is required in the impregnation tank for impregnating. This liquid can be passed to the impregnation tank from container 4 through a down-going pipeline 11 with valve 11a. Through a down-going pipeline 12 with valve 12a the liquid can again be drained off from the impregnation tank to container 3. The impregnating liquid can be pumped directly through a branch pipe 13 with a valve 13a from container 3 to the impregnation tank, and pump 9 is dimensioned so as to impart to the supplied liquid a higher pressure than that in containers 3 and 4, which can be connected with the atmosphere through valves 14 and 15. In addition container 4 communicates with the impregnation tank through a pressure equalizing pipe 16 with valve 16a and an overflow valve 17a arranged to open at a pre-determined maximum pressure in the impregnation tank.

With these devices impregnation of the chips while being kept in the impregnation tank can be carried out in the following manner: With valves 14, 15 and 16a open and valves 12a, 13a and 10a closed, valve 11a is opened and the impregnation tank filled with liquid from container 4. Valves 11a and 16a are then closed and valve 13a opened, so that the pressure in the impregnation tank will be increased by the pump pressure until valve 17a opens, for example at a superatmospheric pressure of 6 kg./cm.$^2$. At this stage shocking is effected by rapidly opening and reclosing valve 16a, which can be effected repeatedly. After the shocking operations valve 13a is closed, valve 10a is opened and the liquid in the impregnation tank flows to container 3 through valve 12a to be pumped back therefrom to container 4 for impregnation of the next charge of chips according to the same procedure etc. Impregnating liquid can be fed into, or drawn off from the system through a valve 18

Fig 2 shows a modification of the accumulator system in which container 4 has been omitted The impregnation can be carried out by exactly the same operation of the valves as previously The only difference is that when valve 11a is opened the liquid is pumped directly from container 3, and when valve 17a and 16a are opened at maximum pressure and shocking communication is opened through pressure balancing pipeline 16 to this container instead of to container 4

The arrangement in conformity with Fig. 1 is slightly more complicated in its structure than that of Fig. 2, but nevertheless the embodiment according to Fig. 1 offers considerable advantages. Thus, pump 9 needs only to have a capacity sufficient to convey the impregnating liquid from container 3 to container 4 in the time which it takes to empty and refill the impregnation tank with chips, and this impregnation tank can thereafter be filled with the liquid in a considerably shorter time, irrespective of the pump capacity, provided that a pipeline 11 of sufficiently large dimensions and a corresponding valve 11a be used.

With the arrangement according to Fig. 2, on the other hand, the pump must have the considerably larger capacity which corresponds to the desirable filling rate and the entire connecting line 10 must be dimensioned correspondingly. This, which is an important, primary disadvantage entails also a secondary disadvantage. If the reductions in pressure caused in the shocking operations by opening valve 16a are to be sufficiently distinct and large the capacity of the pressure generating means must not be too high, so that the supply of pressure liquid must be reduced or choked during the shocking operations if the capacity of the pump is unnecessarily high for this purpose. An unnecessary consumption of power is thereby caused for the generation of pressure. The need for throttling is also the reason why the thinner pipe 13 and valve 13a from the arrangement in Fig. 1 have been retained in that of Fig. 2. It is, as a matter of fact, easier to carry out correct throttling by closing the larger valve entirely and opening the smaller one, than by throttling with the larger valve and omitting the thinner connection, which, however, is possible.

The devices illustrated and described here can be modified in many further ways within the scope of the invention. In the device according to Fig. 1, for example, pipeline 16 can lead to container 3 instead of to container 4, in similarity with the arrangement according to Fig. 2, and pipe 13 can enter at any place of the impregnation tank, etc.

What I claim is:

In a plant for impregnation of wood chips to be subjected to a subsequent continuous cellulose cooking process, said plant comprising a closed impregnation tank, an arrangement for feeding said chips through said tank to digesters in which said continuous cooking process takes place while impregnating the chips in the impregnation tank with impregnating liquid supplied from a closed accumulator system for such liquid, said arrangement comprising in combination a lower closed accumulator tank beneath said impregnation tank for impregnating liquid, an upper accumulator tank above said impregnation tank for impregnating liquid, a pipe- and pump-system arranged to pass impregnating liquid from the lower accumulator tank to the upper accumulator tank and to the impregnation tank alternatively, said pipe- and pump-system including a feed pump for imparting to the impregnating liquid passed to the impregnation tank a considerably higher pressure than the pressure in said lower accumulator tank, a first valved bottom outlet from said upper accumulator tank in closed communication with said impregnation tank, a second valved bottom outlet from said impregnation tank in closed communication with said lower accumulator tank, a further closed conduit system exclusively between the top of said impregnation tank and the top of one of the said accumulator tanks, and valve means to open and shut said further conduit system.

References Cited in the file of this patent

UNITED STATES PATENTS

| | | |
|---|---|---|
| Re. 20,123 | Dunbar | Oct. 6, 1936 |
| 480,334 | Maste | Aug. 9, 1892 |
| 2,121,074 | Dooley | June 21, 1938 |
| 2,200,034 | Merrill | May 7, 1940 |
| 2,229,886 | Dunbar | Jan. 28, 1941 |
| 2,640,774 | Ross et al. | June 2, 1953 |